US012522439B2

(12) United States Patent
Fjeldheim et al.

(10) Patent No.: US 12,522,439 B2
(45) Date of Patent: Jan. 13, 2026

(54) SYSTEM AND METHOD FOR PERFORMING MEASUREMENTS IN STORAGE CONTAINERS

(71) Applicant: Autostore Technology AS, Nedre Vats (NO)

(72) Inventors: Ivar Fjeldheim, Haugesund (NO); Trond Austrheim, Etne (NO)

(73) Assignee: AutoStore Technology AS, Nedre Vats (NO)

( * ) Notice: Subject to any disclaimer, the term of this patent is extended or adjusted under 35 U.S.C. 154(b) by 480 days.

(21) Appl. No.: 17/758,949

(22) PCT Filed: Jan. 27, 2021

(86) PCT No.: PCT/EP2021/051809
§ 371 (c)(1),
(2) Date: Jul. 15, 2022

(87) PCT Pub. No.: WO2021/151916
PCT Pub. Date: Aug. 5, 2021

(65) Prior Publication Data
US 2023/0053090 A1    Feb. 16, 2023

(30) Foreign Application Priority Data

Jan. 31, 2020   (NO) .................................. 20200125

(51) Int. Cl.
*B65G 1/137*    (2006.01)
*G01D 21/02*    (2006.01)

(52) U.S. Cl.
CPC ........... *B65G 1/1375* (2013.01); *G01D 21/02* (2013.01)

(58) Field of Classification Search
CPC .... B65G 1/1375; B65G 1/0478; B65G 1/065; B65G 1/1378; G01D 21/02
See application file for complete search history.

(56) References Cited

U.S. PATENT DOCUMENTS 10,538,388 B2 *  1/2020  Clarke ................... E04B 2/7403
11,299,344 B2 *  4/2022  Lindbo ............... A62C 99/0018
(Continued)

FOREIGN PATENT DOCUMENTS

CN    204903984 U      12/2015
CN    109105009 A  *   1/2019
(Continued)

OTHER PUBLICATIONS

Hoffert, Rudi, International Preliminary Report on Patentability, application PCT/EP2021/051809, dated May 6, 2022, 12 pages, pub. by European Patent Office, Rijswijk.
(Continued)

*Primary Examiner* — Octavia Hollington
(74) *Attorney, Agent, or Firm* — Baker Botts L.L.P.

(57) ABSTRACT

A system for performing measurements in storage containers for storing items includes a framework structure. The storage containers are stored in an automated storage system. The framework structure forms a three-dimensional storage grid structure for storing the storage containers. The grid structure forms vertical storage columns each having a horizontal area defined by the size of an access opening to the vertical storage columns between rails of a rail system. The rail system is arranged on top of the framework structure. The rail system provides available routes for container handling vehicles handling and transferring the storage containers to and from the storage columns. Each vehicle includes a vehicle controller communicating with a central computer system controlling the operation of the storage system. A container handling platform of a container handling vehicle includes measuring equipment configured to perform measurements in containers and includes a communication unit configured to communicate measurement data to a computer system.

21 Claims, 9 Drawing Sheets

(56) References Cited

U.S. PATENT DOCUMENTS

| | | | |
|---|---|---|---|
| 12,146,770 B2 * | 11/2024 | Fjeldheim | G01D 21/02 |
| 12,227,360 B2 * | 2/2025 | Fjeldheim | G01D 21/02 |
| 2003/0139909 A1 | 7/2003 | Ozawa | |
| 2016/0016732 A1 | 1/2016 | Koide et al. | |
| 2016/0340122 A1 | 11/2016 | Lindblom | |
| 2018/0370725 A1 * | 12/2018 | Hognaland | B65G 1/0457 |
| 2019/0263589 A1 | 8/2019 | Clarke et al. | |
| 2019/0322452 A1 * | 10/2019 | Austrheim | B65G 1/1373 |
| 2019/0375590 A1 * | 12/2019 | Gravelle | B65G 1/137 |

FOREIGN PATENT DOCUMENTS

| | | | | |
|---|---|---|---|---|
| CN | 112020468 A | * | 12/2020 | B65G 1/0464 |
| EP | 3326452 A1 | | 5/2018 | |
| GB | 2628390 | * | 9/2024 | |
| JP | 07-206114 A | | 8/1995 | |
| JP | 2019-524112 A | | 9/2019 | |
| JP | 2019-187309 A | | 10/2019 | |
| JP | 2019-532885 A | | 11/2019 | |
| KR | 20220005490 A | * | 1/2022 | |
| KR | 20250078809 A | * | 6/2025 | F25D 25/04 |
| NO | 317366 B1 | | 10/2004 | |
| NO | 20171874 A1 | | 5/2019 | |
| WO | 0118694 A2 | | 3/2001 | |
| WO | 2014090684 A1 | | 6/2014 | |
| WO | 2015193278 A1 | | 12/2015 | |
| WO | 2016166354 A1 | | 10/2016 | |
| WO | 2017081281 A1 | | 5/2017 | |
| WO | 2017150005 A1 | | 9/2017 | |
| WO | 2018022724 A2 | | 2/2018 | |
| WO | 2018073392 A1 | | 4/2018 | |
| WO | WO-2018233886 A1 | * | 12/2018 | B65G 1/0464 |
| WO | WO-2019101725 A1 | * | 5/2019 | B65G 1/0464 |
| WO | 2019179856 A1 | | 9/2019 | |
| WO | WO-2019206971 A1 | * | 10/2019 | B65G 1/0464 |
| WO | WO-2019238662 A1 | * | 12/2019 | B61B 13/00 |

OTHER PUBLICATIONS

L.H. Anh, Office Action for Vietnamese Patent Application No. 1-2022-05288, dated Apr. 24, 2024, 4 pages, pub. by Intellectual Property Office of Vietnam, Hanoi.

International Search Report issued in International Application No. PCT/EP2021/051809, mailed May 3, 2021 (4 pages).

Written Opinion issued in International Application No. PCT/EP2021/051809; Dated May 3, 2021 (9 pages).

International Preliminary Report on Patentability issued in International Application No. PCT/EP2021/051809; mailed May 6, 2022 (21 pages).

Search Report issued in Norwegian Application No. 20200125; Dated Jul. 29, 2020 (3 pages).

Office Action issued in counterpart Chinese Patent Application No. 202180011379.4 mailed on Mar. 29, 2024 (17 pages).

Jing, Lui, Third Office Action for Chinese Patent Application No. 202180011379.4, dated Oct. 18, 2024, 7 pages (including translation), pub. by SIPO, Beijing, China.

Jing, Lui, Second Office Action for Chinese Patent Application No. 202180011379.4, dated Aug. 23, 2024, 10 pages, pub. by SIPO, Beijing, China.

Hoffert, Rudi, Office Action for European Patent Application No. EP21702243.3, dated Sep. 16, 2024, 4 pages, pub. by the EPO, Rijswijk Netherlands.

Toshiaki Itazawa, Notice of Reasons for Rejection for Japanese Patent Application No. 2022-545995, dated Feb. 12, 2025, Japan Patent Office, Tokyo, Japan, 15 pages (inclusive of translation).

Anh, Le Huy, Office Action in VN1202205288, mailed Jul. 17, 2025, 4 pages, Intellectual Property Office of Vietnam, Hanoi, Vietnam.

* cited by examiner

SYSTEM AND METHOD FOR PERFORMING MEASUREMENTS IN STORAGE CONTAINERS

TECHNICAL FIELD

The present invention regards a system and method for performing measurements in an automated storage system, and more specifically a system and method for performing measurements while the containers are being handled by the container handling vehicle.

BACKGROUND AND PRIOR ART

Figure 1:
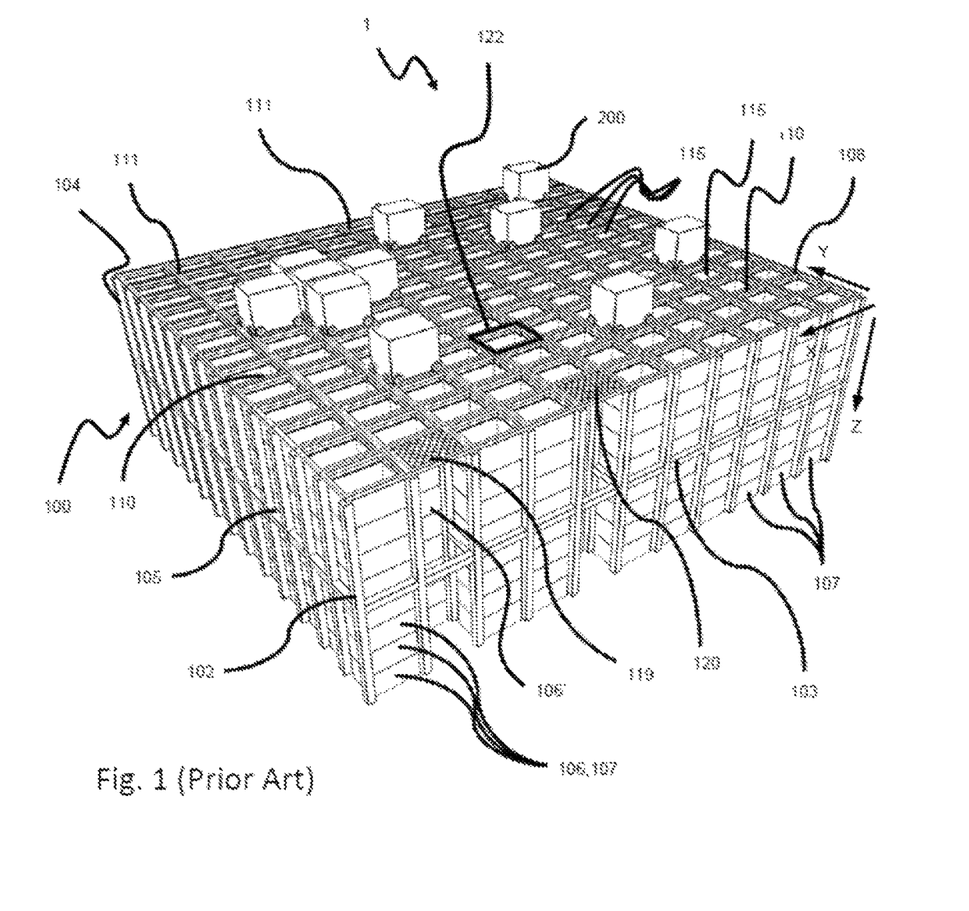
FIG. 1 is a perspective view of a framework structure of a prior art automated storage and retrieval system.
Figure 2:
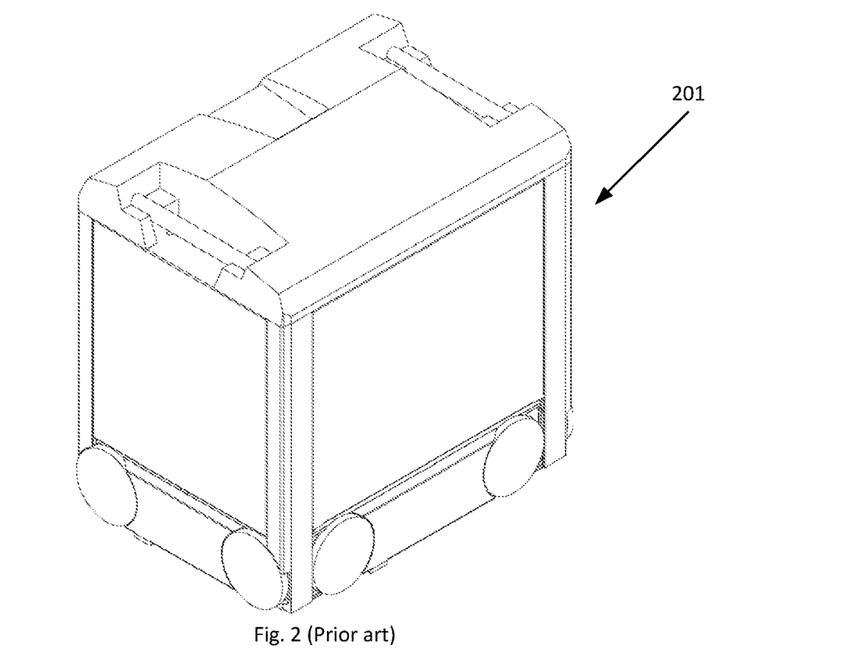
FIG. 2 is a perspective view of a prior art container handling vehicle having a centrally arranged cavity for carrying storage containers therein.
Figure 3:
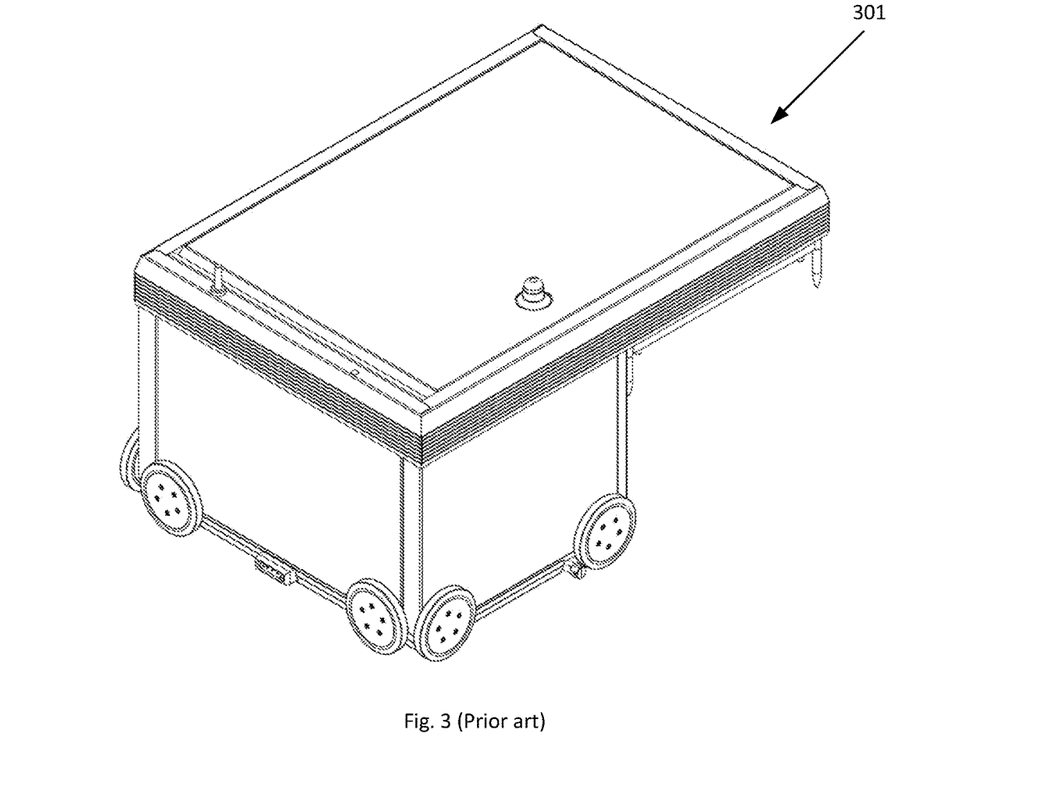
FIG. 3 is a perspective view of a prior art container handling vehicle having a cantilever for carrying storage containers underneath.

FIG. 1 discloses a typical prior art automated storage and retrieval system 1 with a framework structure 100 and FIGS. 2 and 3 discloses two different prior art container handling vehicles 201,301 suitable for operating on such a system 1.

The framework structure 100 comprises several upright members 102 and several horizontal members 103 which are supported by the upright members 102. The members 102, 103 may typically be made of metal, e.g. extruded aluminium profiles.

The framework structure 100 defines a storage grid 104 comprising storage columns 105 arranged in rows, in which storage columns 105 storage containers 106, also known as bins, are stacked one on top of another to form stacks 107. The storage grid 104 guards against horizontal movement of the stacks 107 of storage containers 106, and guides vertical movement of the containers 106, but does normally not otherwise support the storage containers 106 when stacked.

The automated storage and retrieval system 1 comprises a rail system 108 arranged in a grid pattern across the top of the storage 104, on which rail system 108 a plurality of container handling vehicles 201, 301 are operated to raise storage containers 106 from, and lower storage containers 106 into, the storage columns 105, and to transport the storage containers 106 above the storage columns 105. The rail system 108 comprises a first set of parallel rails 110 arranged to guide movement of the container handling vehicles 201, 301 in a first direction X across the top of the frame structure 100, and a second set of parallel rails 111 arranged perpendicular to the first set of rails 110 to guide movement of the container handling vehicles 201, 301 in a second direction Y which is perpendicular to the first direction X. In this way, the rail system 108 defines grid columns 112 above which the container handling vehicles 201, 301 can move laterally above the storage columns 105, i.e. in a plane which is parallel to the horizontal X-Y plane.

Each prior art container handling vehicle 201, 301 comprises a vehicle body 201a, 301a, and first and second sets of wheels 201b, 301b, 201c, 301c which enable the lateral movement of the container handling vehicles 201, 301 in the X direction and in the Y direction, respectively. In FIGS. 2 and 3 two wheels in each set are fully visible. The first set of wheels 201b, 301b is arranged to engage with two adjacent rails of the first set 110 of rails, and the second set of wheels 201c, 301c is arranged to engage with two adjacent rails of the second set 111 of rails. Each set of wheels 201b, 301b, 201c, 301c can be lifted and lowered, so that the first set of wheels 201b, 301b and/or the second set of wheels 201c, 301c can be engaged with the respective set of rails 110, 111 at any one time.

Each prior art container handling vehicle 201, 301 also comprises a container handling platform 401 (not shown) for vertical transportation of storage containers 106, e.g. raising a storage container 106 from, and lowering a storage container 106 into, a storage column 105. The container handling platform 401 comprises one or more gripping/engaging devices (not shown) which are adapted to engage a storage container 106, and which gripping/engaging devices can be lowered from the vehicle 201, 301 so that the position of the gripping/engaging devices with respect to the vehicle 201, 301 can be adjusted in a third direction Z which is orthogonal the first direction X and the second direction Y.

Each prior art container handling vehicle 201, 301 comprises a storage compartment or space for receiving and stowing a storage container 106 when transporting the storage container 106 across the rail system 108. The storage space may comprise a cavity arranged centrally within the vehicle body 201a as shown in FIG. 2 and as described in e.g. WO2015/193278A1, the contents of which are incorporated herein by reference.

FIG. 3 shows an alternative configuration of a container handling vehicle 201, 301301 with a cantilever construction. Such a vehicle is described in detail in e.g. NO317366, the contents of which are also incorporated herein by reference.

The central cavity container handling vehicles 201 shown in FIG. 2 may have a footprint that covers an area with dimensions in the X and Y directions which is generally equal to the lateral extent of a grid column 112, i.e. the extent of a grid column 112 in the X and Y directions, e.g. as is described in WO2015/193278A1, the contents of which are incorporated herein by reference. The term 'lateral' used herein may mean 'horizontal'.

Alternatively, the central cavity container handling vehicles 101 may have a footprint which is larger than the lateral area defined by a grid column 112, e.g. as is disclosed in WO2014/090684A1.

In the X and Y directions, neighbouring grid cells are arranged in contact with each other such that there is no space there-between.

In a storage grid 104, most of the grid columns 112 are storage columns 105, i.e. grid columns 105 where storage containers 106 are stored in stacks 107. However, a grid 104 normally has at least one grid column 112 which is used not for storing storage containers 106, but which comprises a location where the container handling vehicles 201, 301 can drop off and/or pick up storage containers 106 so that they can be transported to an access station (not shown) where the storage containers 106 can be accessed from outside of the grid 104 or transferred out of or into the grid 104. Within the art, such a location is normally referred to as a 'port' and the grid column 112 in which the port is located may be referred to as a 'port column' 119, 120. The transportation to the access station may be in any direction, that is horizontal, tilted and/or vertical. For example, the storage containers 106 may be placed in a random or dedicated grid column 112 within the storage grid 104, then picked up by any container handling vehicle 201, 301 and transported to a port 119, 120 for further transportation to an access station. Note that the term 'tilted' means transportation of storage containers 106 having a general transportation orientation somewhere between horizontal and vertical.

When a storage container 106 stored in the grid 104 disclosed in FIG. 1 is to be accessed, one of the container handling vehicles 201, 301 is instructed to retrieve the target storage container 106 from its position in the grid 104 and transport it to the drop-off port 119. This operation involves moving the container handling vehicle 201, 301201, 301 to a grid location above the storage column 105 in which the target storage container 106 is positioned, retrieving the storage container 106 from the storage column 105 using the container handling vehicle's 201, 301 container handling platform 401s (not shown), and transporting the storage container 106 to the drop-off port 119. If the target storage container 106 is located deep within a stack 107, i.e. with one or a plurality of other storage containers 106 positioned above the target storage container 106, the operation also involves temporarily moving the above-positioned storage containers 106 prior to lifting the target storage container 106 from the storage column 105. This step, which is sometimes referred to as "digging" within the art, may be performed with the same container handling vehicle 201, 301 that is subsequently used for transporting the target storage container 106 to the drop-off port 119, or with one or a plurality of other cooperating container handling vehicles. Alternatively, or in addition, the automated storage and retrieval system 1 may have container handling vehicles specifically dedicated to the task of temporarily removing storage containers 106 from a storage column 105. Once the target storage container 106 has been removed from the storage column 105, the temporarily removed storage containers 106 can be repositioned into the original storage column 105. However, the removed storage containers 106 may alternatively be relocated to other storage columns.

When a storage container 106 is to be stored in the grid 104, one of the container handling vehicles 201, 301 is instructed to pick up the storage container 106 from the pick-up port 120 and transport it to a grid location above the storage column 105 where it is to be stored. After any storage containers 106 positioned at or above the target position within the storage column stack 107 have been removed, the container handling vehicle 201, 301 positions the storage container 106 at the desired position. The removed storage containers 106 may then be lowered back into the storage column 105 or relocated to other storage columns.

A problem with the prior art solutions is that if there are perishable items in the storage there is a need for measuring the freshness of the products and the conditions the items are stored in. There is however a problem with getting accurate readings of the items without having to turn to costly solutions that require expensive equipment or extensive rebuilds. It is therefore an object of the present invention to solve the mentioned problems.

SUMMARY OF INVENTION

The present invention is set forth and characterized in the independent claims, while the dependent claims describe other characteristics of the invention.

In one aspect, the present invention regards a system for performing measurements in storage containers for storing items, the storage containers are stored in an automated storage system comprising a framework structure forming a three-dimensional storage grid structure for storing the storage containers, where the grid structure forms vertical storage columns each having a horizontal area defined by the size of an access opening to the vertical storage columns between rails of a rail system and where the rail system is arranged on top of the framework structure, the rail system providing available routes for container handling vehicles handling and transferring the storage containers to and from the storage columns, each vehicle comprising a vehicle controller communicating with a central computer system controlling the operation of the storage system, and wherein said system is further wherein a container handling platform of a container handling vehicle comprises measuring equipment configured to perform measurements in containers and further comprises communication means configured to communicate measurement data to a computer system.

Further the central computer system or a climate control system or a container handling vehicle has a computer system is configured to analyse the measurements and compare them to one or more predefined threshold levels representing acceptable temperature, moisture, gas and visual appearance, and the central computer system is configured to store the measurements together with an ID of the container.

Also, the container handling platform is connected to the container handling vehicle by means bands controlled enabling it to be raised and lowered by an electric motor wherein the rope, band or wire used for lifting and lowering the container handling platform comprises electrical wires for transferring power and enabling communication between the container handling platform and the container handling vehicle.

The container handling platform comprises temperature measurement equipment, moisture detectors, gas detectors and cameras and the container handling platform comprises a UV light source for killing bacteria and mildew on the surface of the items in the containers and the container handling platform comprises a UV light source for detecting bacteria and mildew on the surface of the items in the containers.

Also the container handling platform comprises at least one rechargeable power source to power the measuring equipment and wherein the container handling platform and the container handling vehicle comprises light communication equipment for transferring data between them.

A container handling vehicle for handling containers for storing items, the storage containers are stored in an automated storage system comprising a framework structure forming a three-dimensional storage grid structure for storing the storage containers, where the grid structure forms vertical storage columns each having a horizontal area defined by the size of an access opening to the vertical storage columns between rails of a rail system and where the rail system is arranged on top of the framework structure, the rail system providing available routes for the container handling vehicles handling and transferring the storage containers to and from the storage columns, each vehicle comprising a vehicle controller communicating with a central computer system controlling the operation of the storage system, wherein a container handling platform of the container handling vehicle comprises measuring equipment configured to perform measurements in said containers and further comprises communication means configured to communicate measurement data to a computer system.

A method for performing measurements in storage containers for storing items, the storage containers are stored in an automated storage system comprising a framework structure forming a three-dimensional storage grid structure for storing the storage containers, where the grid structure forms vertical storage columns each having a horizontal area defined by the size of an access opening to the vertical storage columns between rails of a rail system and where the rail system is arranged on top of the framework structure providing available routes for container handling vehicles handling and transferring the storage containers to and from the storage columns, each vehicle comprising a vehicle controller communicating with a central computer system controlling the operation of the storage system, and wherein said method comprises the steps of using a container handling platform of a container handling vehicle to handle a container, using equipment attached to the container handling platform to perform measurements in the container, transmitting measurement data to the central computer system, analysing the transmitted measurement data, instructing the container handling vehicle to transport the container to a predetermined destination that is dependent on the results of the analysis, using the container handling vehicle to transport the container to the next destination.

BRIEF DESCRIPTION OF THE DRAWINGS

It should be understood, that the drawings are not intended to limit the invention to the subject-matter depicted in the drawings.

DETAILED DESCRIPTION

In the following, embodiments of the invention will be discussed in more detail with reference to the appended drawings. It should be understood, however, that the drawings are not intended to limit the invention to the subject-matter depicted in the drawings.

The framework structure 100 of the automated storage and retrieval system 1 is constructed in accordance with the prior art framework structure 100 described above in connection with FIGS. 1, i.e. a number of upright members 102 and a number of horizontal members 103, which are supported by the upright members 102, and further that the framework structure 100 comprises a first, upper rail system 108 in the X direction and Y direction.

The framework structure 100 further comprises storage compartments in the form of storage columns 105 provided between the members 102, 103, where storage containers 106 are stackable in stacks 107 within the storage columns 105.

The framework structure 100 can be of any size. In particular it is understood that the framework structure can be considerably wider and/or longer and/or deeper than disclosed in FIG. 1. For example, the framework structure 100 may have a horizontal extent of more than 700×700 columns and a storage depth of more than twelve containers.

The container handling vehicles has a lifting frame for holding the containers when the container handling vehicles are handling the containers. The lifting frame can be a container handling platform 401 that in addition to holding the container also functions as a lid covering the top of the container.

FIG. 2 is an alternative solution of a container handling vehicle 201 with a central cavity solution.

FIG. 3 shows an alternative configuration of a container handling vehicle 301 with a cantilever construction.

Figures 4, 5:
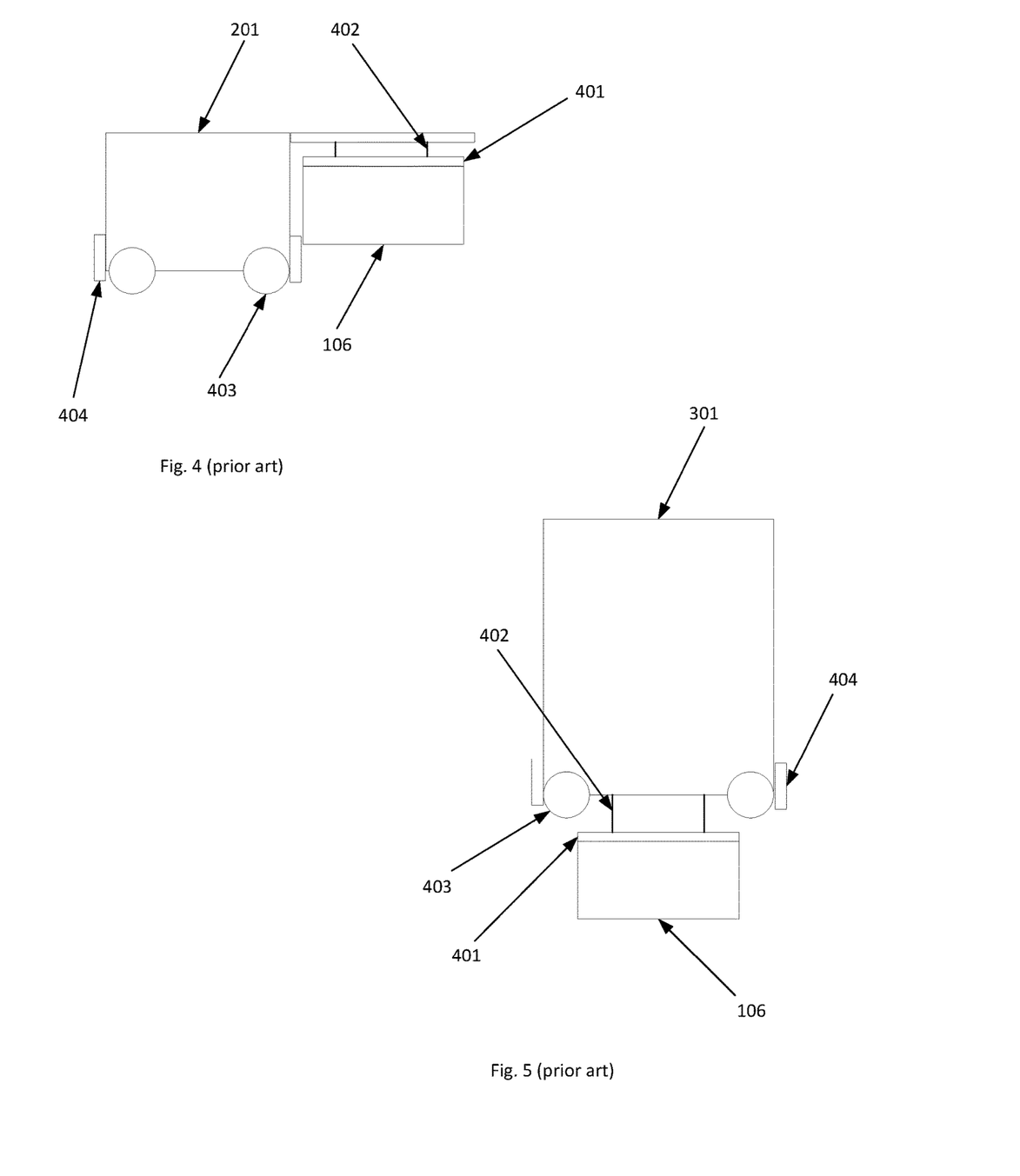
FIG. 4 is a side view of a container handling vehicle with a cantilever solution carrying a container using its container handling platform.
FIG. 5 is a side view of a container handling vehicle with a central cavity solution carrying a container using its container handling platform.

FIG. 4 is a side view of a container handling vehicle 201, 301 with a cantilever solution carrying a container using its container handling platform 401. The container handling platform 401 of the container handling vehicle 201, 301 holds the container in place using a pair of grippers. The grippers and the lifting and lowering of the container handling platform 401 is controlled by the central computer system.

FIG. 5 is a side view of a container handling vehicle 201, 301 with a central cavity solution carrying a container using its container handling platform 401. The container handling platform 401 of the container handling vehicle 201, 301 holds the container in place using a pair of grippers. The grippers and the lifting and lowering of the container handling platform 401 is controlled by the central computer system.

Figure 6:
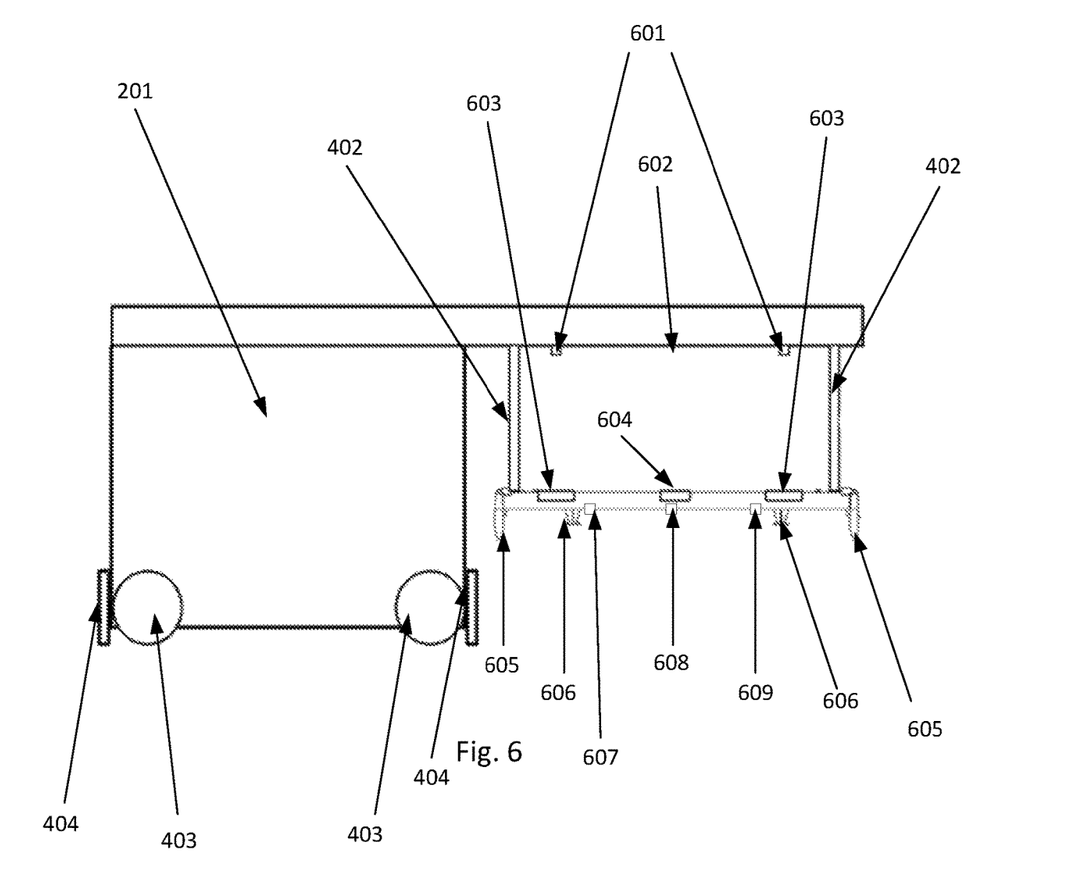
FIG. 6 is a side view of a container handling vehicle with a cantilever solution wherein the container handling platform is shown in detail.

FIG. 6 is a side view of a container handling vehicle 201, 301 with a cantilever solution wherein the container handling platform 401 according to an embodiment of the present invention is shown in detail. In this solution the communication between the container handling vehicle 201, 301 and the container handling platform 401 of the container handling vehicle 201, 301 is done using wireless communication. This can be in the form of a short-range radio communication network like Bluetooth® or Zigbee, or it can be a long-range radio communication network like Wi-Fi, or it can be light communication like Li-Fi. The central computer system tells the container handling platform 401 when to grip and when to release. In addition to this command the computer system on the container handling vehicle 201, 301 tells the container handling platform 401 when to start performing measurements. The results of the measurements are transmitted back to the computer system on the container handling vehicle. The container handling vehicle 201, 301 further transmits the information to a computer system that stores and analyses the information from all the container handling vehicles. The computer system makes decisions based on the analysed information from the container handling vehicle. These decisions are transmitted to the central computer system which again informs the container handling vehicle. In an alternative solution all the information is transmitted to the central computer system and all the analysis is performed there.

In FIG. 6 there is a container handling vehicle 201, 301 with a cantilever solution. This is a solution wherein the container 106 is lifted up adjacent to the main body of the container handling vehicle. The container handling platform 401 of this solution is attached to the container handling vehicle 201, 301 by a set of straps, wires, ropes or bands 402. These straps, wires, ropes or bands 402 are attached to an electric motor. This ensures the lifting and the lowering of the container handling platform 401. The container handling platform 401 comprises a set of grippers for gripping the containers 106. Further there is measuring equipment 607, 608, 609 like temperature measurement equipment, moisture detectors, gas detectors and cameras attached to the container handling platform 401. At each corner of the container handling platform 401 there are guiding rods. These guiding rods are used for positioning the lifting frame correctly for lifting the containers 106. On the upper side of the container handling platform 401 there are two charging points for charging a rechargeable power source in the container handling platform 401. In addition to this there is a transmitter for transmitting at the measurements from the container handling platform 401 to the container handling vehicle. This rechargeable power source supplies power to the measuring equipment 607, 608, 609, the grippers, the transmitter equipment and optionally, a UV light source for killing bacteria and mildew on the surface of the items.

The rechargeable power source on the container handling platform 401 is charged by the at least one rechargeable power source of the container handling vehicle, when the container handling platform 401 is in its highest position.

Figure 7:
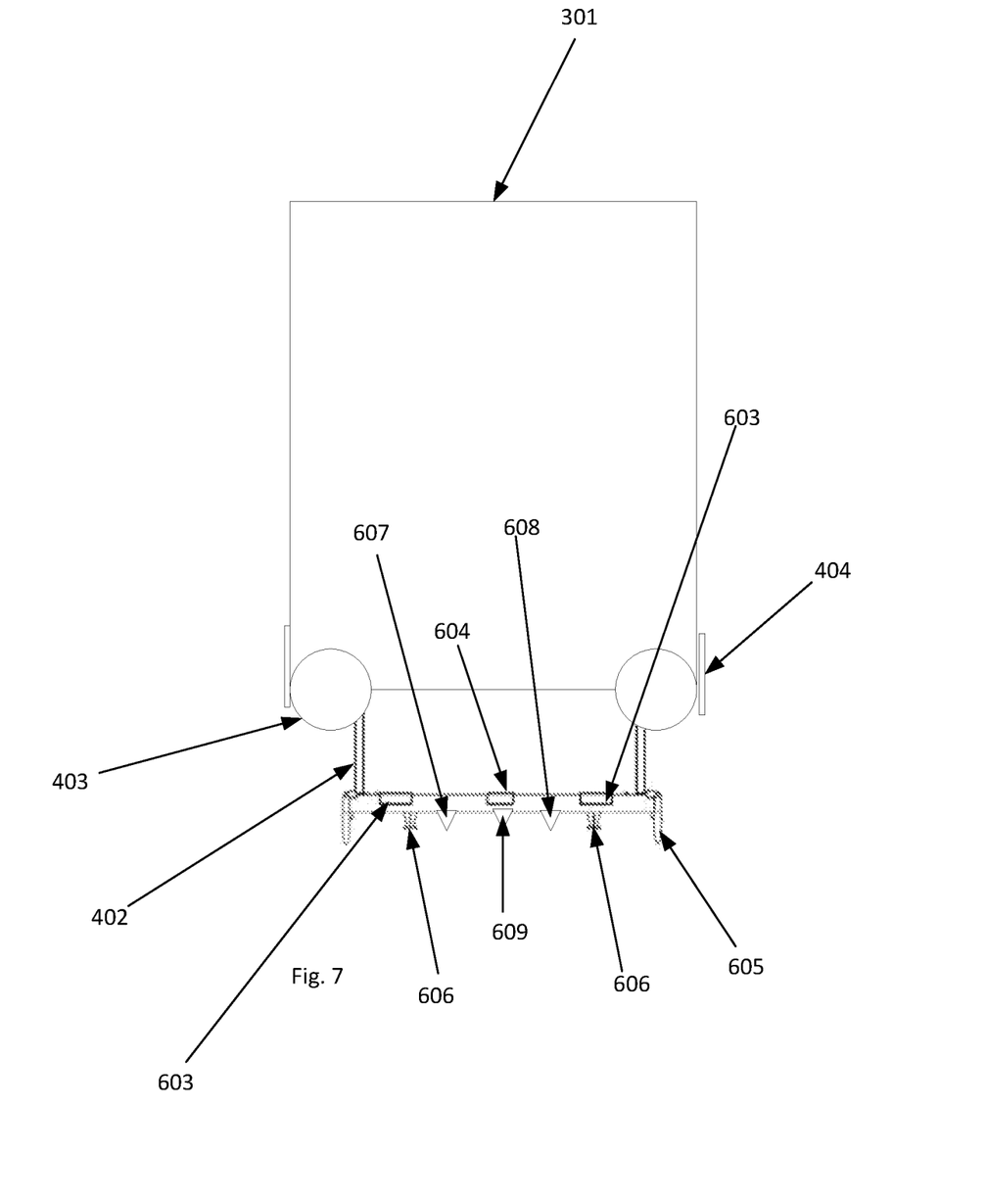
FIG. 7 is a side view of a container handling vehicle with a central cavity solution wherein its container handling platform is shown in detail.

FIG. 7 is a side view of a container handling vehicle 201, 301 with a central cavity solution wherein its container handling platform 401 according to an embodiment of the present invention is shown in detail. In this solution the communication between the container handling vehicle 201, 301 and the container handling platform 401 of the container handling vehicle 201, 301 is done using wireless communication. This can be in the form of a short-range radio communication network like Bluetooth® or Zigbee, or it can be a long-range radio communication network like Wi-Fi, or it can be light communication like Li-Fi. The computer system on the container handling vehicle 201, 301 tells the container handling platform 401 when to grip and when to release. In addition to this command the computer system on the container handling vehicle 201, 301 tells the container handling platform 401 when to start performing measurements. The results of the measurements are transmitted back to the computer system on the container handling vehicle. The container handling vehicle 201, 301 further transmits the information to a computer system that stores and analyses the information from all the container handling vehicles. The computer system makes decisions based on the analysed information from the container handling vehicle. These decisions are transmitted to the central computer system which again informs the container handling vehicle. In an alternative solution all the information is transmitted to the central computer system and all the analysing is performed there.

In the drawing there is a container handling vehicle 201, 301 with a central cavity solution. In this solution the container 106 is lifted up into a central cavity of the main body of the container handling vehicle. The container handling platform 401 of this solution is attached to the container handling vehicle 201, 301 by a set of wires, ropes or bands 402. These wires, ropes or bands 402 are attached to drums driven by an electric motor. Coordinated winding and unwinding ensures the lifting and the lowering of the container handling platform 401 in a horizontal configuration. The container handling platform 401 comprises a set of grippers for gripping the containers 106. Further there are measuring equipment 607, 608, 609 attached to the container handling platform 401. At each corner of the container handling platform 401 there are guiding rods. These guiding rods are used for positioning the lifting frame correctly for lifting the containers. On the upper side of the container handling platform 401 there are two electrodes 601 for charging a rechargeable power source in or on the container handling platform 401. In addition to this there is a transmitter for transmitting the measurements from the container handling platform 401 to the container handling vehicle. This rechargeable power source supplies power to the measuring equipment 607, 608, 609, the grippers, the transmitter equipment and optionally, a UV light source for killing bacteria and mildew on the surface of the items.

Figure 8:
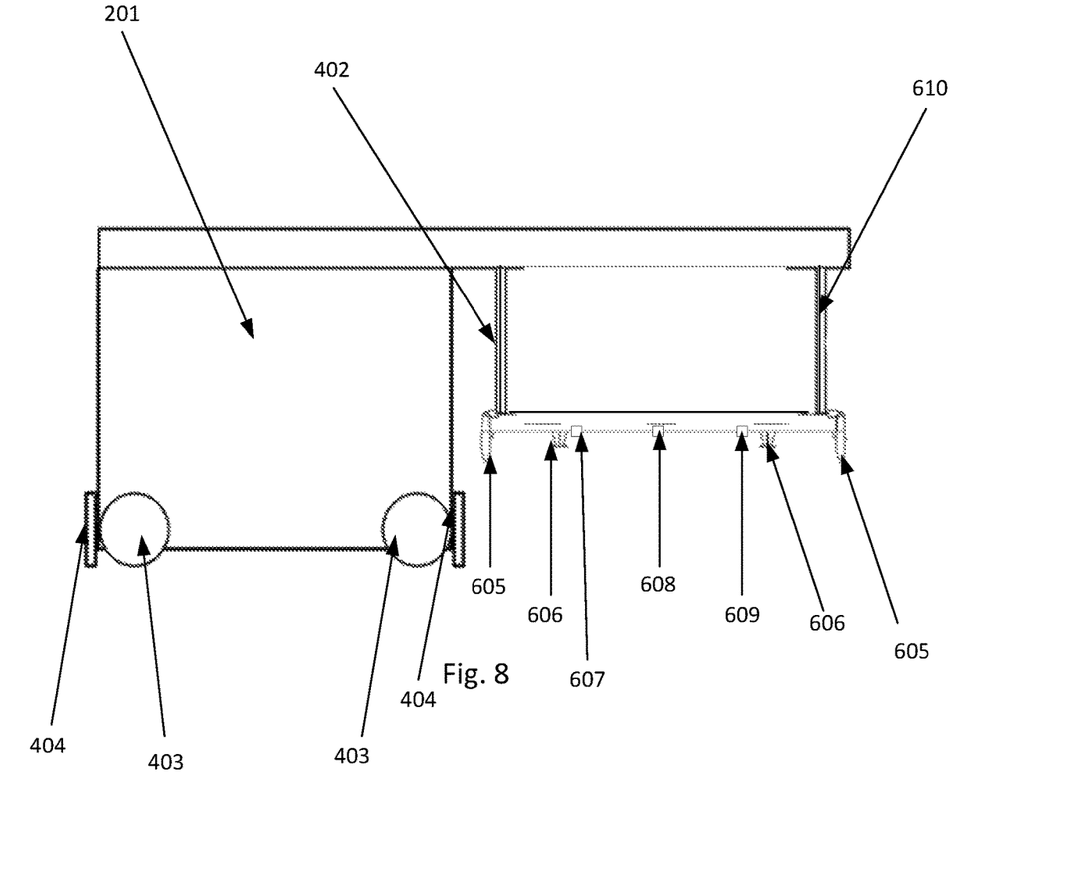
FIG. 8 is a side view of an alternative solution to the present invention wherein the container handling platform is supplied with power and communication via wires imbedded in the wires, bands or ropes for lifting, or lowering the container handling platform.

FIG. 8 is a side view of an alternative solution to the present invention wherein the container handling platform 401 is supplied with power and communication via electrical wires 610 imbedded in the wires, bands or ropes for lifting 402. These electrical wires 610 can be both for supplying the grippers and the measuring equipment 607, 608, 609 with power, but also there can be data wires for communicating data to and from the grippers and the measuring equipment 607, 608, 609.

The central computer system tells the container handling platform 401 when to grip and when to release. In addition to this command the central computer system tells the container handling platform 401 when to start performing measurements. The results of the measurements are transmitted back to either a specific computer system or a central computer system. The wires, ropes or bands 402 connecting the container handling vehicles to the container handling platform 401 are imbedded with electrical wires 610 for both transmitting information and for distributing power in order to perform all the tasks.

The container handling vehicle 201, 301 transmits the measurement data to a computer system that stores and analyses the information from all the container handling vehicles. The computer system makes decisions based on the analysed information from the container handling vehicle. These decisions are transmitted to the central computer system which again informs the container handling vehicle. These decisions can be where to transport the container 106. If the container items in the container 106 is spoiled the container 106 is transported to an area where the spoiled items can be disposed of properly. If the items are OK they are either transported back into the storage grid or to a port for further distribution. Optionally, the decision can be to use the UV light to kill bacteria and mildew. In an alternative solution all the information is transmitted to the central computer system and all the analysing is performed there.

In FIG. 8 there is a container handling vehicle 201, 301 with a cantilever solution. The main body of the container handling vehicle 201, 301 comprises all the equipment needed for the container handling vehicle 201, 301 to operate on the storage system. The container handling platform 401 of this solution is attached to the container handling vehicle 201, 301 by a set of straps, wires, ropes or bands 402. These straps, wires, ropes or bands 402 are attached to an electric motor. This ensures the lifting and the lowering of the container handling platform 401. The container handling platform 401 comprises a set of grippers for gripping the containers 106. Further there is measuring equipment 607, 608, 609 attached to the container handling platform 401. At each corner of the container handling platform 401 there are guiding rods. These guiding rods are used for positioning the lifting frame correctly for lifting the containers 106. On the upper side of the container handling platform 401 there is two electrodes 601 for charging a rechargeable power source in the container handling platform 401. In addition to this there is a transmitter for transmitting at the measurements from the container handling platform 401 to the container handling vehicle. This rechargeable power source supplies power to the measuring equipment 607, 608, 609, the grippers, the transmitter equipment and optionally, a UV light source for killing bacteria and mildew on the surface of the items.

Figure 9:
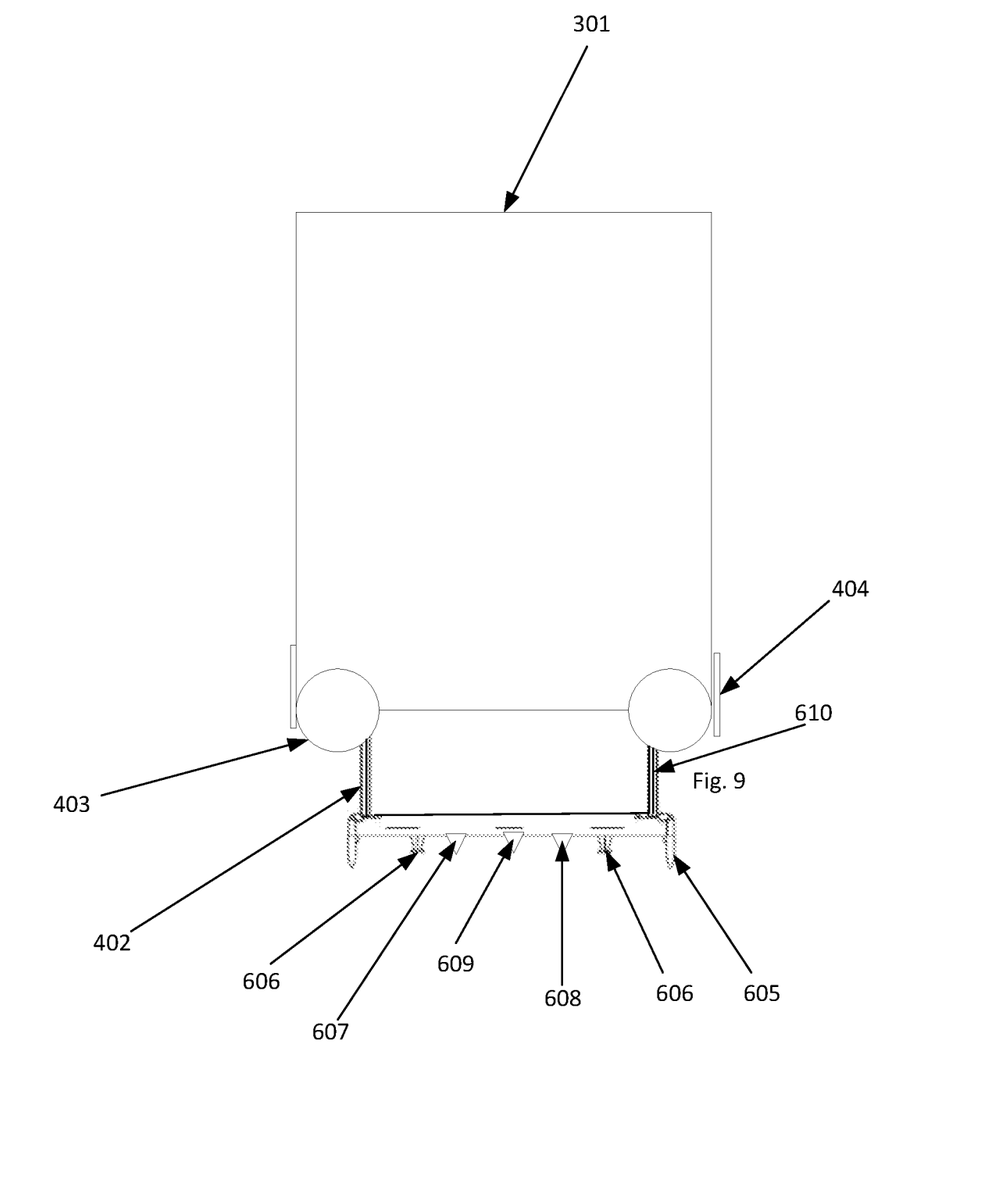
FIG. 9 is a side view of an alternative solution to the present invention wherein the container handling platform is supplied with power and communication via wires imbedded in the wires, bands or ropes for lifting, or lowering the container handling platform.

FIG. 9 is a side view of an alternative solution to the present invention wherein the container handling platform 401 is supplied with power and communication via electrical wires 610 imbedded in the wires, bands or ropes 402 for lifting, or lowering the container handling platform 401. These electrical wires 610 can be both for supplying the grippers and the measuring equipment 607, 608, 609 with power, but also there can be data wires for communicating data to and from the grippers and the measuring equipment 607, 608, 609.

The computer system on the container handling vehicle 201, 301 tells the container handling platform 401 when to grip and when to release. In addition to this command the computer system on the container handling vehicle 201, 301 tells the container handling platform 401 when to start performing measurements. The results of the measurements are transmitted back to the computer system on the container handling vehicle. The wires from the container handling vehicles and the container handling platform 401 are imbedded with wires both for transmitting information and for distributing power in order to perform all the tasks.

The container handling vehicle 201, 301 transmits the information to a computer system that stores and analyses the information from all the container handling vehicles. The computer system makes decisions based on the analysed information from the container handling vehicle. These decisions are transmitted to the central computer system which again informs the container handling vehicle. In an alternative solution all the information is transmitted to the central computer system and all the analysing is performed there.

In FIG. 9 there is a container handling vehicle 201, 301 with a cantilever solution. The main body of the container handling vehicle 201, 301 comprises all the equipment needed for the container handling vehicle 201, 301 to operate on the storage system. The container handling platform 401 of this solution is attached to the container handling vehicle 201, 301 by a set of straps, wires, ropes or bands 402. These straps, wires, ropes or bands 402 are attached to an electric motor. This ensures the lifting and the lowering of the container handling platform 401. The container handling platform 401 comprises a set of grippers for gripping the containers 106. Further there are measuring equipment 607, 608, 609 attached to the container handling platform 401. At each corner of the container handling platform 401 there are guiding rods. These guiding rods are used for positioning the lifting frame correctly for lifting the containers 106. On the upper side of the container handling platform 401 there is two electrodes 601 for charging a rechargeable power source in the container handling platform 401. In addition to this there is a transmitter for transmitting at the measurements from the container handling platform 401 to the container handling vehicle. This rechargeable power source supplies power to the measuring equipment 607, 608, 609, the grippers, the transmitter equipment and optionally, a UV light source for killing bacteria and mildew on the surface of the items.

In a preferred embodiment of the present invention the container handling platform 401 is comprised of at least one sensor. The at least one sensor can be used to measure, the temperature in the container 106, further the sensor can be used to detect the presence of gasses that is released during rotting of food. One such gas can be methane. Other gasses that are released during decay of food is carbon dioxide and hydrogen sulphide. In the case of carbon dioxide and hydrogen sulphide they are heavier than air and will therefore collect at the bottom of the container 106. The sensors for sensing carbon dioxide and hydrogen sulphide can therefore be attached to a probe 1001 that is lowered into the container 106. Alternatively, there can be holes in the sides or in the bottom of the containers 106 into which there is possible to insert sensors. In yet another solution there can be a slit or a tunnel e.g. along the edges of the container 106 wherein the probe 1001 can be lowered into the bottom of the container 106 without the content of the container 106 hindering the probe 1001. Further there can be detectors to detect moisture. The presence of moisture is due to the fact that during decomposition of food the cells of the food is broken down and the liquid in the cells leaks out.

A further measuring equipment 607, 608, 609 can be a camera. The camera can take pictures looking into the container 106 in order to detect if there is any sign of decomposition of the food. The camera can be an ordinary camera that takes colour images in order to detect if there is marks on the food. Like e.g. brown spots on bananas, or discoloration on the surface due to mildew. Alternatively, there can be used a camera that takes images using ultraviolet light in order to detect mildew. There is also the possibility to use UV light in order to kill bacteria on the food. There is further a possibility to use UV light to kill mildew. Therefor the container handling platform 401 can have a UV light source that can be used to both detect decomposition of food and to kill bacteria and mildew on the food and in the container 106. The difference between using the UV light source to detect decay and to kill bacteria and mildew is the wavelength of the light and the power of the light source. UVC light with a range from 280-100 nm is used to kill bacteria and mildew. The area needs only to be exposed for a few seconds with a distance of a few cm in order to have the desired effect. An example would be exposure of about 10 seconds at a distance of about 25-30 cm. It is to be understood that this is an example of a distance and exposure time, and variations in time and distance is obvious to a person skilled in the art. However, the longer the area is exposed to the UVC light the more effective it is, and the more types of bacteria and mildew will be killed. In an embodiment of the present invention the items in the container 106 can be exposed for UV-light for as long as the container 106 is carried by the container handling vehicle.

Decay can be detected using a blacklight. A blacklight uses UVA light with a wavelength of 315-400 nm. The bacteria and mildew will light up on an image when it is exposed to the blacklight.

Figure 10:
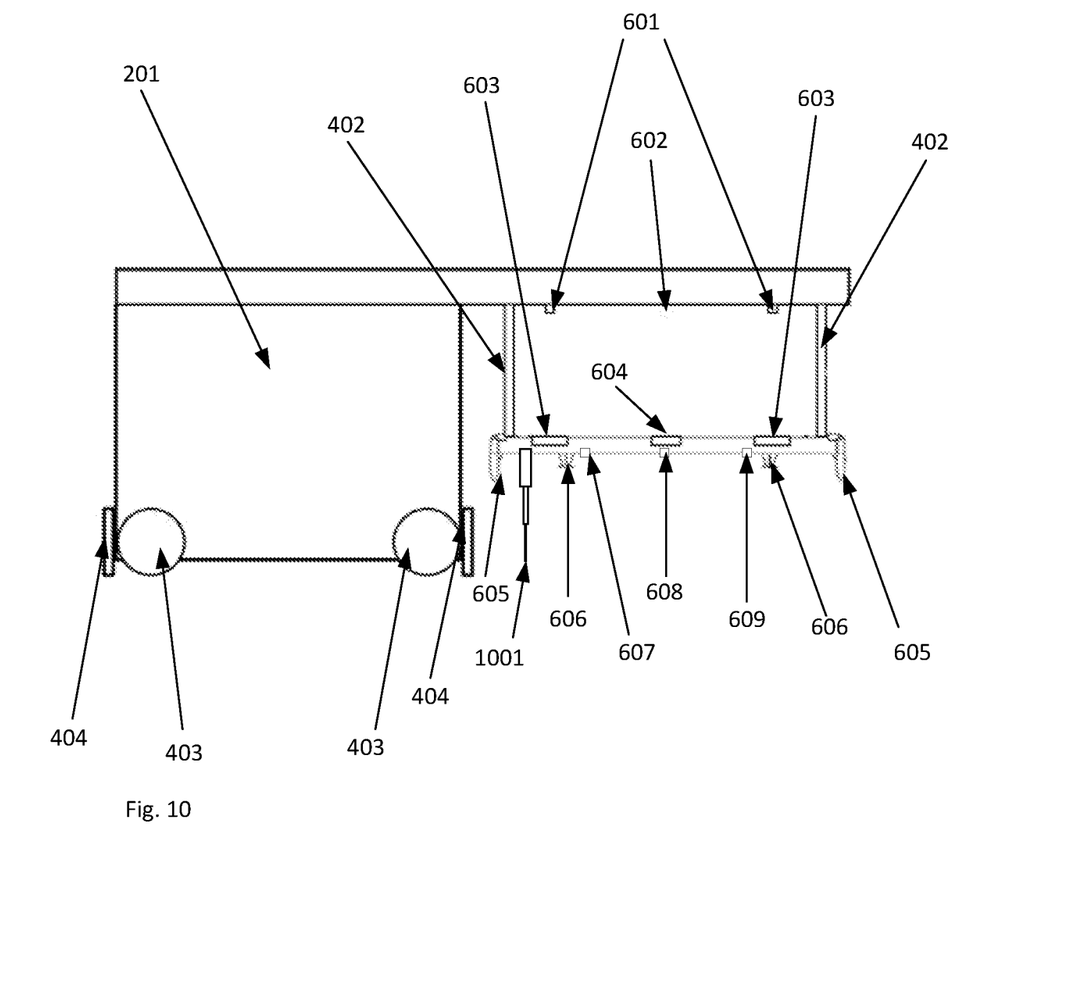
FIG. 10 is a side view of a container handling vehicle with a container handling platform comprising an extendable probe with a sensor at the lower most end that can be lowered into a container.

FIG. 10 is a side view of a container handling vehicle 201, 301 with a container handling platform 401 comprising an extendable probe 1001. At the lower most end of the extendable probe 1001 there is a sensor. This sensor can be used to detect carbon dioxide and hydrogen sulphide. The probe 1001 is lowered into the container 106 when the container 106 is attached to the container handling platform 401. The sensor(s) detect if there are carbon dioxide or hydrogen sulphide present in the container 106. The measuring data is sent to the computer system for analysis. The result of the analysis gives an indication of which state the items in the container 106 is in. Depending on the quality of the items the container 106 is either transported to be properly disposed of, or they are transported back into the storage grid or the port for further distribution.

Figure 11A:
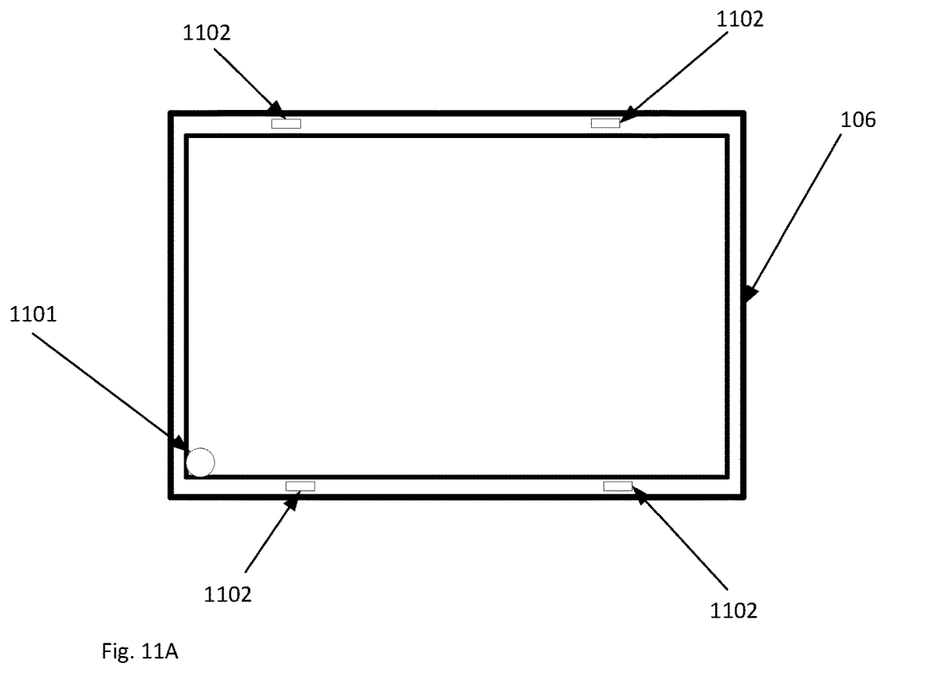
FIG. 11A and FIG. 11B is a top view and a side view of a container with a tunnel in the container wherein the probe with a sensor at the lower most end can be lowered into the bottom of the container without the content of the container hindering the probe.
Figure 11B:
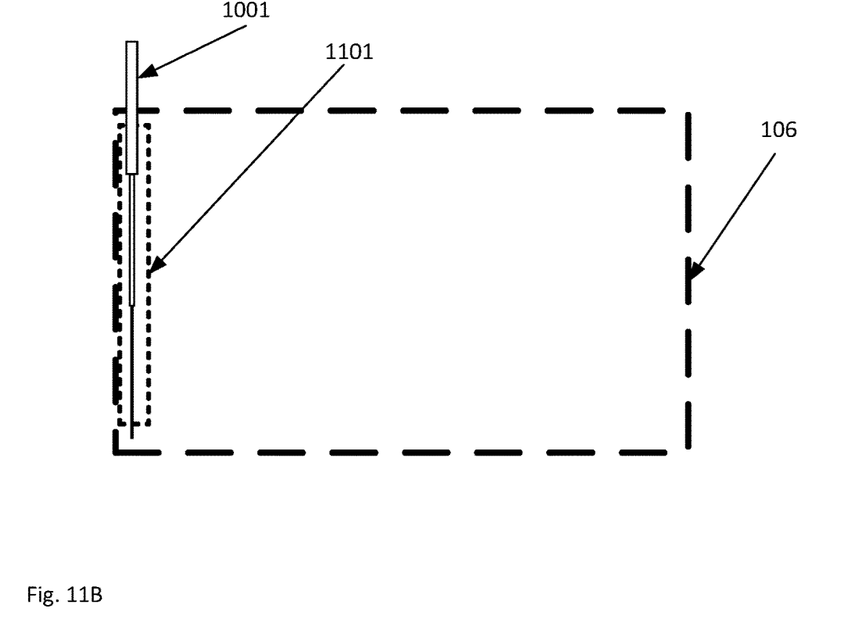

FIG. 11A and FIG. 11B is a top view and a side view of a container 106 with a tunnel in the container 106 wherein the probe 1001 with a sensor at the lower most end can be lowered into the bottom of the container 106 without the content of the container 106 hindering the probe 1001. The tunnel may have a cylindrical form with an opening in either end. The lower most end of the cylinder 1101 is placed a distance from the bottom of the container 106. The distance is at least enough to ensure that the sensor(s) at the end of the probe 1001 can protrude further down than the lower most end of the cylinder 1101.

When the container handling platform 401 is connected to the slots 1102 of the container 106, the probe 1001 is lowered into the cylinder 1101 and the sensors perform the measurements. The data form the measurements are transmitted from the container handling platform 401 to the container handling vehicle. In a preferred embodiment the data from the measurements are transmitted from the container handling vehicle 201, 301 to a computer system. In an alternative embodiment of the present invention a computer system on the container handling vehicle 201, 301 performs the analysis of the measurement data and transmits the results of the analysis to a central computer system.

LIST OF REFERENCE NUMBERS

Prior Art (FIGS. 1-11):
- 100 Framework structure
- 102 Upright members of framework structure
- 103 Horizontal members of framework structure
- 104 Storage grid
- 105 Storage column
- 106 Storage container
- 106' Particular position of storage container
- 107 Stack
- 108 Rail system
- 110 Parallel rails in first direction (X)
- 110a First rail in first direction (X)
- 110b Second rail in first direction (X)
- 111 Parallel rail in second direction (Y)
- 111a First rail of second direction (Y)
- 111b Second rail of second direction (Y)
- 112 Access opening
- 119 First port column
- 120 Second port column
- 201 Prior art storage container vehicle
- 201a Vehicle body of the storage container vehicle
- 201b Drive means/wheel arrangement, first direction (X)
- 201c Drive means/wheel arrangement, second direction (Y)
- 301 Prior art cantilever storage container vehicle
- 301a Vehicle body of the storage container vehicle 101
- 301b Drive means in first direction (X)
- 301c Drive means in second direction (Y)
- X First direction
- Y Second direction
- Z Third direction
- 401 Container handling platform.
- 402 Bands, wires or ropes for raising or lowering the container
- 601 Electrodes for charging the auxiliary rechargeable power source
- 602 Transceiver
- 603 Electrodes for charging the auxiliary power source
- 604 Transceiver
- 605 Guiding pins
- 606 Gripper elements
- 607 Measuring equipment
- 608 Measuring equipment
- 609 Measuring equipment
- 610 Electrical wires for supplying the container handling platform with power and information.
- 1001 Probe for lowering into the container.
- 1101 Cylinder for guiding the probe into the bottom of the container.
- 1102 Slots for gripping the containers with the gripping elements of the container handling platforms.

The invention claimed is:

1. A system for performing measurements in storage containers for storing items, the storage containers are stored in an automated storage system comprising a framework structure forming a three-dimensional storage grid structure for storing the storage containers, wherein the grid structure forms vertical storage columns each having a horizontal area defined by the size of an access opening to the vertical storage columns between rails of a rail system and where the rail system is arranged on top of the framework structure, the rail system providing available routes for container handling vehicles handling and transferring the storage containers to and from the storage columns, each vehicle comprising a vehicle controller communicating with a central computer system controlling the operation of the storage system, and wherein a container handling platform of a container handling vehicle comprises measuring equipment configured to perform measurements of at least temperature in containers and further comprises communication means configured to communicate measurement data to a computer system, wherein the container handling platform is for holding one of the storage containers.

2. The system according to claim 1, wherein the central computer system is configured to analyse the measurements and compare them to one or more predefined threshold levels representing acceptable temperature, moisture, gas, and visual appearance.

3. The system according to claim 1, wherein a climate control system is configured to analyse the measurements and compare them to one or more predefined threshold levels representing acceptable temperature, moisture, gas, and visual appearance.

4. The system according to claim 1, wherein the container handling vehicles has a computer system configured to analyse the measurements and compare them to one or more predefined threshold levels representing acceptable temperature, moisture, gas and visual appearance.

5. The system according to claim 1, wherein the central computer system is configured to store the measurements together with an ID of one of the storage containers.

6. The system according to claim 1, wherein the container handling platform is connected to the container handling vehicle by rope, bands, or wire enabling the container handling platform to be raised and lowered by an electric motor.

7. The system according to claim 6, wherein the rope, bands, or wire used for lifting and lowering the container handling platform comprises electrical wires for transferring power and enabling communication between the container handling platform and the container handling vehicle.

8. The system according to claim 1, wherein the container handling platform comprises moisture detectors, gas detectors, and cameras.

9. The system according to claim 1, wherein the container handling platform comprises a UV light source for killing bacteria and mildew on a surface of the items in the storage containers.

10. The system according to claim 1, wherein the container handling platform comprises a UV light source for detecting bacteria and mildew on a surface of the items in the storage containers.

11. The system according to claim 1, wherein the container handling platform comprises at least one rechargeable power source to power measuring equipment.

12. The system according to claim 1, wherein the container handling platform and the container handling vehicle comprises light communication equipment for transferring data between them.

13. A container handling vehicle for handling storage containers for storing items, the storage containers are stored in an automated storage system comprising a framework structure forming a three-dimensional storage grid structure for storing the storage containers, wherein the grid structure forms vertical storage columns each having a horizontal area defined by the size of an access opening to the vertical storage columns between rails of a rail system and where the rail system is arranged on top of the framework structure, the rail system providing available routes for the container handling vehicles handling and transferring the storage containers to and from the storage columns, each vehicle comprising a vehicle controller communicating with a central computer system controlling the operation of the storage system, wherein a container handling platform of the container handling vehicle comprises measuring equipment configured to perform measurements of at least temperature in said containers and further comprises communication means configured to communicate measurement data to a computer system.

14. A method for performing measurements in storage containers for storing items, the storage containers are stored in an automated storage system comprising a framework structure forming a three-dimensional storage grid structure for storing the storage containers, wherein the grid structure forms vertical storage columns each having a horizontal area defined by the size of an access opening to the vertical storage columns between rails of a rail system and where the rail system is arranged on top of the framework structure providing available routes for container handling vehicles handling and transferring the storage containers to and from the vertical storage columns, each vehicle comprising a vehicle controller communicating with a central computer system controlling the operation of the automated storage system, and wherein said method:
- using a container handling platform of a container handling vehicle to handle a storage container,
- using equipment attached to the container handling platform to perform measurements of at least temperature in the storage container,
- transmitting measurement data to the central computer system,
- analysing the transmitted measurement data,
- instructing the container handling vehicle to transport the storage container to a predetermined destination that is dependent on the results of the analysis,
- using the container handling vehicle to transport the storage container to a next destination.

15. The method according to claim 14, wherein the measurement equipment on the container handling platform performs measurements of temperature, moisture, and gas level in the storage container and cameras are used for visual inspection of products.

16. The method according to claim 14, wherein the central computer system is configured to store the measurements together with an ID of the container where the measurements are performed.

17. The method according to claim 14, wherein the container handling platform is raised and lowered by a rope, band, or wire raised and lowered by an electric motor.

18. The method according to claim 14, wherein at least one rechargeable power source in the container handling platform powers measuring equipment on the container handling platform.

19. The method according to claim 18, wherein the at least one rechargeable power source in the container handling platform is charged when the container handling platform is at a top most position.

20. The method according to claim 14, wherein the container handling platform and the container handling vehicle uses light as a means for communication.

21. The method according to claim 14, wherein the container handling platform receives energy and communication via cables imbedded in a rope, band, or wire used for lifting and lowering the container handling platform.

* * * * *